O. BRUECK,

Assignor to G. BRUECK.

Fan.

No. 8,207. Reissued April 30, 1878.

Witnesses.

Hugo Bruggemann

Chas. Wahlers

Inventor.

Otto Brueck.

by

Van Santvoord & Hauff

Attys

N. PETERS, PHOTO-LITHOGRAPHER, WASHINGTON, D. C.

UNITED STATES PATENT OFFICE.

OTTO BRUECK, OF UNION HILL, NEW JERSEY, ASSIGNOR TO GUSTAV BRUECK, OF NEW YORK CITY.

IMPROVEMENT IN FANS.

Specification forming part of Letters Patent No. 70,952, dated November 19, 1867; Reissue No. 8,207, dated April 30, 1878; application filed April 17, 1878.

*To all whom it may concern:*

Be it known that I, OTTO BRUECK, formerly of the city, county, and State of New York, now of Union, Hill in the county of Hudson and State of New Jersey, have invented a new and useful Improvement in Fans, which improvement is fully set forth in the following specification, reference being had to the accompanying drawing, in which—

Figure 1:
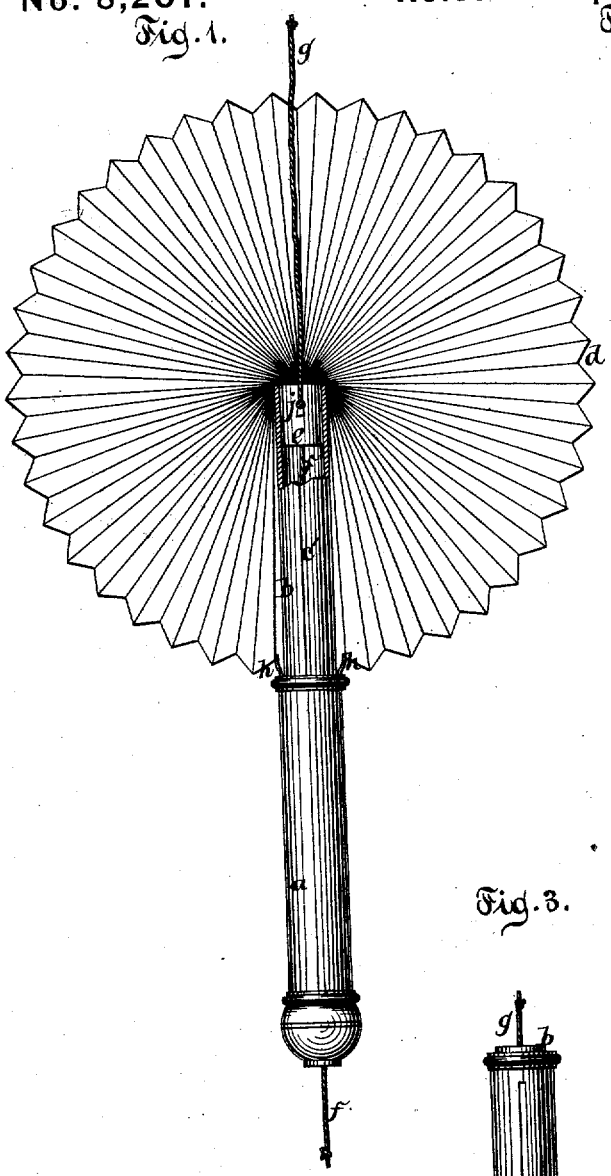
Figure 2:
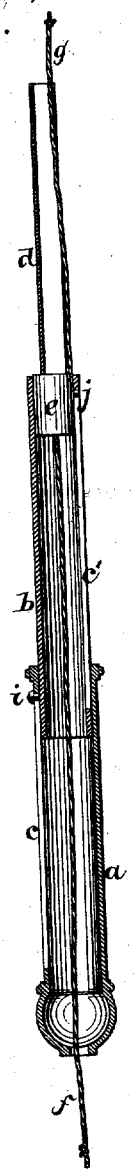
Figure 3:
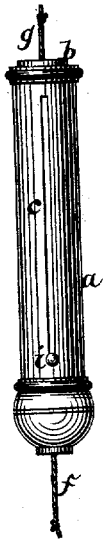

Figure 1 represents an elevation of the fan extended and expanded. Fig. 2 is a longitudinal central section thereof. Fig. 3 represents the fan closed and concealed in the outer case.

Similar letters indicate corresponding parts.

This invention relates to a fan of novel construction, which can be worn and used by itself, or be combined with other articles of personal use—as, for instance, with a card-case, or a pocket-book, or a parasol, or, in general terms, with any article which is not too bulky or too heavy to be conveniently handled. In this example I have shown my fan in a separate state, in which condition it can be worn, and used without connecting it with any other article. Its connection or combination with other articles is accomplished by attaching the outer case of the fan to such an article in any convenient manner.

My invention consists in a tubular telescopic handle composed of two sections, one of which slides in the other, the inner or secondary section being adapted to receive the fan in its folded state, said fan being connected to the main section of the handle, and to a head which slides in the secondary section, so that by moving this head out the fan is expanded and the telescopic handle is extended, and by moving the head in, the fan is folded up into the secondary section of the handle, and said handle is contracted, allowing it to be carried conveniently in the pocket.

In the drawing, the letter *a* designates a tubular case, which incloses the fan when in a shut-up condition, and which, when the fan is not combined with other articles, forms the handle, by which it is held and used. The letter *b* designates a secondary tubular case, which receives the leaves of the fan into itself when the fan is shut up, and which is so made and arranged as to slide in and out of the case *a* in closing or opening the fan. The leaves *d* of the fan are, in this example, so made and arranged as to assume a circular shape when fully expanded; but any other shape may be adopted, to suit the taste or judgment of the maker. The depth of the folds of the several leaves is a little less than the diameter of the secondary or extension case *b*, so as to allow said case to receive the leaves without destroying their shape. The extension and expansion of the fan and its closure are accomplished by means of a movable head, *e*, which holds the central extremities of the leaves of the fan, and is free to slide up and down in the case *b*.

In Fig. 1 the upper end of case *b* is partly broken away, in order to show said head with distinctness. The fan can be extended and expanded, and also closed, by means of cords *f g*, attached to the head *e*, or by means of pins projecting through the cases *a b*, as shown in the drawing. In this example I have shown such pins *i j*, which project, respectively, from the sliding extension-case *b* and the movable head *e*, so that they can be operated by hand. The pin *i* of the sliding case *b* projects through a longitudinal slot, *c*, made in the side of the outer case *a*, Fig. 3, the ends of the slot serving as stops to arrest the pin when the inner case has been moved in or out the proper distance. The pin *j* in the same way furnishes facilities for operating the fan by moving it up or down in the case *b*, said pin working in a longitudinal slot, *c'*, in case *b*. The side folds or leaves of the fan, when the fan is extended, are separated by the case *b*, along the outer sides of which they extend down to the upper end of case *a*, to which they are fastened at *h h*, as shown in Fig. 1. When the fan is shut, the said side folds are made to take their places along the inner side of case *b*.

The operation of the fan is as follows: To extend and expand it from the condition seen in Fig. 3, one pulls the cord *g* and draws out the sliding case *b* to the extent allowed by the pin *i* and slot *c*, the fan meanwhile being drawn out of the inner case, because the ends of its side folds are fastened to the outer case at *h h*. When the case *b* has become fully extended, the fan is also fully expanded. In closing the fan, one pulls the cord *f* and draws the case *b* within case *a*, into which the case *b* slides easily by the strain of the cord *f*, which is attached to the head *e*. This head is drawn in, and the folds or leaves of the fan are returned into their sheath or case.

The size of the fan can be varied to suit the maker—from the size of a common pencil-case to the size of ordinary fans; and the cases may be of any suitable material, metallic, wooden, or mineral. The leaves of the fan are flexible, to allow them to be turned into and out of the case *b*.

I am aware that a fan has been manufactured in Meissen, Saxony, which, when drawn in, is entirely shut up in its own case. Said fan, however, is composed of a single tube, into which the fan can be drawn, and in order to obtain a fan of proper dimensions the tube must necessarily be made of such a length that it is not very convenient to carry. By my telescope arrangement the length of the whole device, when shut up, is reduced one-half, and a fan is obtained which can be conveniently carried in the pocket.

What I claim as new, and desire to secure by Letters Patent, is—

The combination, with fan-leaves *d*, of a tubular telescopic handle, composed of two sections, one of which slides in the other, the inner secondary section being adapted to receive the fan-leaves in their folded state, said fan-leaves being connected at their outer ends to the main section of the handle, and at their inner ends to a head, which slides in the secondary section, the whole being adapted to operate substantially in the manner herein shown and described.

In testimony that I claim the foregoing I have hereunto set my hand and seal this 26th day of April, 1877.

OTTO BRUECK. [L. S.]

Witnesses:
W. HAUFF,
E. F. KASTENHUBER.